United States Patent [19]

Mixner

[11] 4,420,702
[45] Dec. 13, 1983

[54] RESILIENT MOTOR MOUNTING FOR AN ELECTRIC DRY SHAVER OR THE LIKE

[75] Inventor: Ingomar Mixner, Klagenfurt, Austria

[73] Assignee: U.S. Philips Corporation, New York, N.Y.

[21] Appl. No.: 397,390

[22] Filed: Jul. 12, 1982

Related U.S. Application Data

[63] Continuation of Ser. No. 202,034, Oct. 29, 1980, abandoned.

[30] Foreign Application Priority Data

Nov. 22, 1979 [AT] Austria ................................. 7441/79

[51] Int. Cl.³ .............................................. H02K 5/04
[52] U.S. Cl. ......................................... 310/50; 30/45; 310/42; 310/43; 310/89
[58] Field of Search ................... 30/45, 43.4, 43.7; 220/4 B, 4 E, 306; 310/50, 89, 43, 42, 47; 30/45

[56] References Cited

U.S. PATENT DOCUMENTS

| | | | |
|---|---|---|---|
| 3,300,664 | 1/1967 | Boyles | 310/89 |
| 3,479,540 | 11/1969 | Fox | 310/89 |
| 3,611,568 | 10/1971 | Alexander et al. | 30/45 |
| 3,727,749 | 4/1973 | Martin | 206/17.5 |
| 4,027,096 | 5/1977 | Waddington et al. | 174/52 R |
| 4,220,880 | 9/1980 | Woodard | 310/89 |

*Primary Examiner*—J. D. Miller
*Assistant Examiner*—D. L. Rebsch
*Attorney, Agent, or Firm*—Rolf E. Schneider

[57] ABSTRACT

There is provided an apparatus such as a dry shaver comprising a housing formed by two opposing housing shells. An electric motor is mounted on at least one support extending from one housing shell. Adjacent the support a resilient hook is formed integrally with, and projects from, such one housing shell in order to secure the motor to the shell, the resilient hook engaging an edge portion of the motor and urging the motor against the support. A projection extends inwardly from the other housing shell to engage the resilient hook and thereby constitute a stop for it and position the hook relative to the motor.

2 Claims, 3 Drawing Figures

RESILIENT MOTOR MOUNTING FOR AN ELECTRIC DRY SHAVER OR THE LIKE

This is a continuation of application Ser. No. 202,034, filed Oct. 29, 1980, now abandoned.

This invention relates to an apparatus provided with an electric motor, for example a dry-shaving apparatus, a citrus press or the like, which comprises two housing shells, one of which serves as a mount for the motor, which motor is positioned on at least one support on said housing shell and is secured thereto by at least one fixing means. Such an apparatus should meet the requirement that the motor, which generally constitutes a comparatively heavy component, is retained in the apparatus in a reliable manner, so that, for example in the case of shocks, it does not become detached from its mount or its position relative to other apparatus parts with which it cooperates is changed in an undesirable manner. For this purpose it is for example known from U.S. Pat. No. 3,679,921 to secure the motor to a housing shell by means of a screw connection. For mass production it is desirable that the appliances can be assembled as simply as possible, within minimal time and with a minimum number of separate components. The last-mentioned requirements cannot be met in a satisfactory manner when a screw connection is used.

Therefore, it is the object of the present invention to provide a reliable mount for a motor on a housing shell, which furthermore does not require any separate components for mounting the motor, so that mounting is particularly simple. According to the invention such an apparatus is characterized in that the fixing means is constituted by at least one resilient hook member which is formed integrally with and projects from the housing shell carrying the motor, which hook engages with an edge portion of the motor, urges said motor against the support and secures it to the housing shell, and that on the other housing shell, corresponding to said hook, there is provided a projection which engages with and constitutes a stop for said hook and which defines the position of the hook relative to the motor. In this way the motor can be mounted very simply on the housing shell supporting it, because the motor need only be snapped behind the hook, after which it is already retained by the hook. After assembly of the two housing shells of the apparatus the projection provided on the other housing shell engages with the hook, so that the position of said hook relative to the motor can no longer be changed, thus providing an absolutely reliable mount for the motor, which, also if the apparatus is subject to shocks, guarantees that the motor cannot become detached from its mount or become displaced.

It is to be noted that from DE-OS No. 28 15 288 an arrangement is known for securing a small electric motor to a receptacle, from which a resilient mount projects, which engages with a projection on the motor by means of a latching cam and urges the motor against a rigid mount, the resilient mount being latched to the motor after the latter mount has been snapped into position by a structural member which is fitted behind the resilient mount on the receptacle. However, the provision in accordance with the invention of the present snapping and latching device in apparatus comprising two housing shells, employing a resilient latching hook on the one shell and a latching stop in the form of a projection on the other shell, ensures that at the same time that the housing is closed or opened the resilient hook is latched or unlatched, without the need of mounting or removing a special structural member for this purpose.

It is found to be particularly advantageous, in accordance with the invention, if on its free end the hook is formed with a ramp or sloping surface for displacing the hook before it engages with the motor. In this way no tool is required in order to latch the motor behind the hook, because when it is brought into its operating position it simply snaps behind the motor under resilient deflection of the hook.

Furthermore it is found to be advantageous if the support, in a manner known per se, includes an elastic pad and the projection engages with the hook under the influence of a force and urges it towards the motor. This ensures that the motor is elastically retained in the apparatus under constraining pretension.

The invention will now be described in more detail with reference to the accompanying drawings, in which FIG. 1 is a cross-sectional view of a dry-shaving apparatus with an oscillating-armature motor, which at its stator end is secured to a housing shell by means of a hook.

Figure 1:
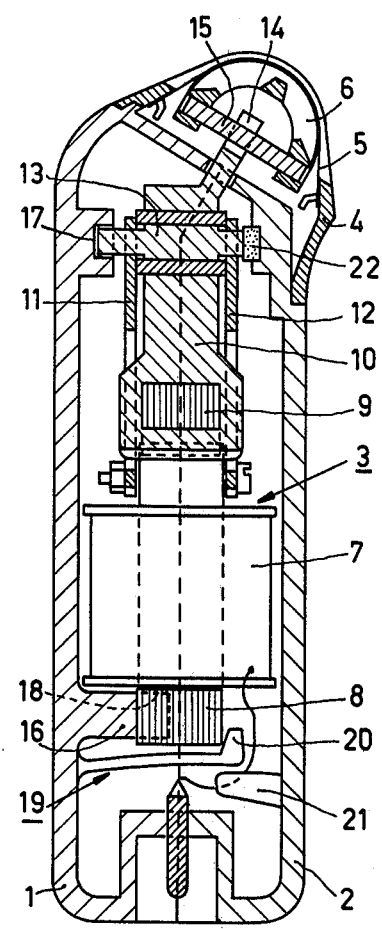

The dry shaving apparatus shown in FIG. 1 comprises two housing shells 1 and 2, which in addition to other apparatus parts accommodate an oscillating-armature motor 3. On the two housing shells 1 and 2 a shaving head frame 4 is mounted which carries an arcuate shear foil 5, which in the usual manner cooperates with a reciprocator arcuate cutter 6.

For driving said cutter 6 there is provided the oscillating-armature motor 3, which comprises a stator 8, which is provided with an exciter coil 7, and an oscillating armature 9, connected to an oscillating-armature lever 10. The stator 8 and the oscillating-armature lever 10 are combining to an assembly by means of two mounting plates 11 and 12, the oscillating-armature lever 10 being pivotal about a spindle 13 which is mounted in the mounting plates 11 and 12. The oscillator-armature lever 10 has a free end 14 which projects from the housing shells 1 and 2, which end is fork-shaped so that it can be coupled to a pin 15 provided on the cutter 6.

In order to mount the oscillating-armature motor 3 in the housing shells 1 and 2, said motor is first of all connected to the housing shell 1, after which this assembly is placed onto the housing shell 2. Subsequently, the housing shells 1 and 2 are interconnected in a manner, not shown, for example by a screw or snap connection. In order to provide a reliable mount for the oscillating-armature motor 3 on the housing shell 1, said shell is provided with two inwardly extending motor supports. One support member 16 is constituted by a ridge, on which the stator 8 is positioned. The other support 17 is constituted by a recess in the housing shell 1, in which recess the free end of the spindle 13 for the oscillating-armature lever 10 can be inserted and seated. By inserting the free end of the spindle 13 into the recess 17, the oscillating-armature motor 3 is at the same time positioned relative to the housing shell 1. In order to position the oscillating-armature motor on the stator side the ridge constituting the support 16 includes projections 18 which engage with the circumference of the stator 8.

In order to secure the oscillating armature motor 3 to the housing shell 1, two hooks 19 are arranged on the housing shell 1 near the support 16 mirror-symmetrically relative to the plane of the cross-section of FIG. 1, only one of said hooks thus being shown. Said hooks are integral with the housing shell 1 and resiliently project therefrom, their hook portions 20 engaging with a circumferential portion of the motor, namely the stator 8. Since the hooks 19 are resilient they urge the stator 8 against its support 16 and thus secure the oscillating-armature motor 3 to the housing shell 1. Mounting is simply effected in that the hooks 19 are slightly bent back by hand or by means of a tool, after which the oscillating-armature motor 3 is placed onto its supports 16, 17 and the hooks are subsequently released.

On the other housing shell 2, corresponding to each of the two hooks 19, there is provided a projection 21 which engages the free end of the relevant hook, constitutes a stop for said hook, and defines the position of the hook relative to the motor. In this way it is achieved that as soon as the housing shell 2 has been placed onto the housing shell 1 the hooks 19 can no longer be moved resiliently, such movement being prevented by the associated projections 21. This arrangement provides an absolutely reliable mounting of the oscillating armature motor 3 on the housing shell 1, which when the apparatus is for example subject to shocks also takes up the inertial forces exerted by the oscillating-armature motor 3. As can be seen in FIG. 1, there may be some clearance between the hooks 19 and the associated projections 21, which serve to prevent the hooks from being moved so far that the oscillating armature motor is released in the finished assembled condition of the apparatus. Such clearance may for example be effective to allow for dimensional tolerances.

The oscillating-armature motor 3 is secured to the housing shell 1 with hooks only at the location of its stator. This is found to be satisfactory in order to enable the housing shell 2 to be readily placed onto the housing shell 1 during assembly of the apparatus. However, it is then necessary that in the finished assembled condition of the apparatus the oscillating-armature motor 3 is also retained between the two housing shells at the location of its oscillating armature, for which there is provided a rubber pad 22 on the housing shell 2, which pad cooperates with the other end of the spindle 13 of the oscillating-armature lever and which presses the free end of said spindle into the recess 17, so that at this location an elastic mounting is obtained for the oscillating-armature motor.

Obviously the shape and location of the hooks may be realized in various manners. For example, the hook may also be constituted by a leaf spring, which at one free end is embedded in or secured to the housing shell 1 and at its other free end is provided with a hook-shaped portion.

Figure 2:
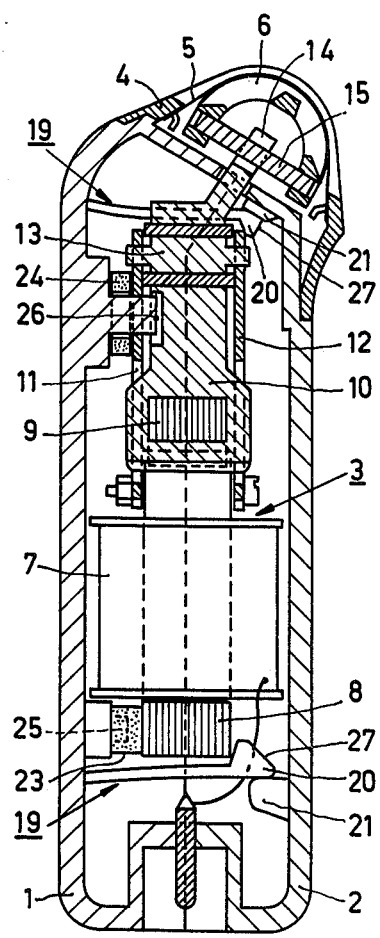
FIG. 2 shows a dry-shaving apparatus of the same type as shown in FIG. 1, the oscillating armature motor being secured to a housing shell by means of hooks at its opposite ends.

In the embodiment of FIG. 2 the oscillating-armature 3 is secured to the housing shell 1 by means of four hooks 19. Two of these hooks again engage with the stator side of the oscillating armature motor, whilst the other two hooks cooperate with the oscillating armature motor at the location of the oscillating-armature lever, i.e. engage with the edge portion of the supporting plate 12 of the oscillating armature with their hook portions 20. The two hooks which each engage with an end of the oscillating armature motor are situated mirror-symmetrically relative to the plane of the cross-section of FIG. 2, only two of said four hooks thus being shown. In this way the oscillating-armature motor 3 is secured to the housing shell 1 in an absolutely reliable manner. If desired, there may of course be provided further hooks which engage with the circumference of the oscillating-armature motor.

In the present embodiment the supports for the oscillating-armature motor on the housing shell 1 include elastic pads 23 and 24 respectively, as is known per se. Said pads are constituted by rubber rings, which are fitted on and associated with corresponding projections or support members 25 and 26 formed integrally with the housing shell 1 in order to keep them in position. For supporting the stator end of the motor there are provided two associated pads 23, which in a similar way as the hooks 19 are also situated mirror-symmetrically relative to the plane of the cross-section of FIG. 2. For supporting the end of the motor near the oscillating armature 10 there is provided the centrally disposed pad 24. The pin-shaped projection 26 for said pad 24 then at the same time serves for positioning the oscillating-armature motor, for which purpose the free end of said projection extends into a recess formed in the supporting plate 11.

For each of the four hooks 19 there is again provided an associated projection 21 on the housing shell 2, which when the housing shells 1 and 2 are assembled engages with the relevant hook and thereby constitutes a stop for said hook, so that the projection defines the position of the relevant hook relative to the motor. As is apparent from FIG. 2, the projections 21 engage with the hooks 19 under the influence of a force, urging said hooks towards the motor, so that the motor is urged against the elastic pads which provide the support with a specific fixed pretension. In this way a particularly reliable mounting of the motor is guaranteed, because mounting is not only achieved through the resilient action of the hooks, but also through the cooperation of the projections with the hooks.

In the present embodiment the hooks 19 are each provided with a ramp or sloping surface 27 on the free ends constituting the hook portions 20. Said ramp surfaces 27 ensure that when the oscillating-armature motor 3 is mounted on the housing shell 1 it can readily be snapped behind the hooks 19. When the motor is brought into its operating position the hooks are first displaced by cooperation of the motor with the ramp surfaces, after which they engage with the relevant edge portions of the motor when the motor is in the correct position relative to the housing shell 1. In this way mounting is very simple, because the hooks need not be displaced by hand.

Figure 3:
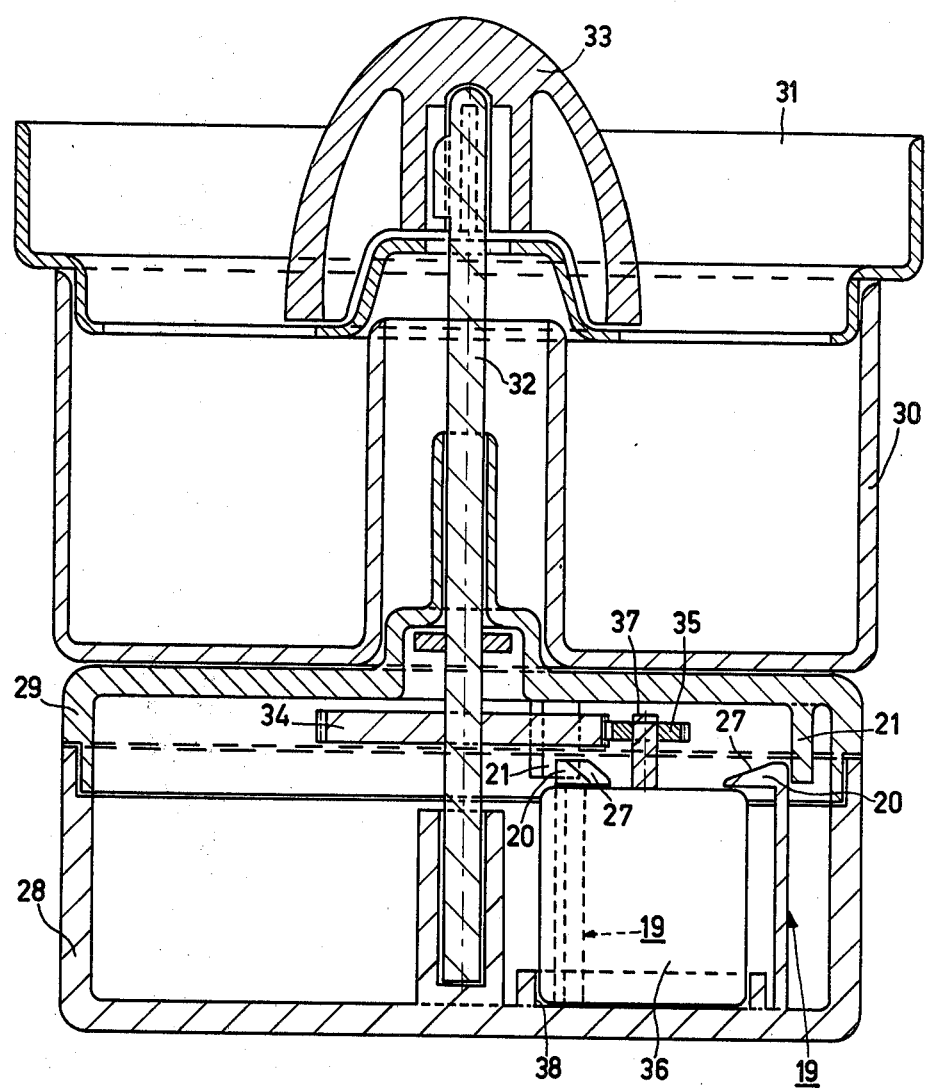
FIG. 3 is a cross-sectional view of a citrus press with a motor for a rotary drive, which motor is also secured to a housing shell by means of hooks only.

The citrus press shown in FIG. 3 comprises a basic unit with two housing shells 28 and 29, whilst an annular receptacle 30 can be placed onto the housing shell 29 and an annular filter 31 onto said receptacle. A drive spindle 32 extends through the receptacle 30 and the filter 31, which spindle projects from the housing shell 29. On the free end of said drive spindle 32 a pressing cone 33 can be fitted in such a way that it is locked against rotation, which cone in known manner serves for extracting juice from citrus fruit. The drive spindle 32 is driven by a motor 36 via a reduction gear constituted by gear wheels 34 and 35. The gear wheel 34 is mounted on the drive spindle 32 and the gear wheel 35 on the shaft 37 of the motor 36.

The motor 36, which in the present embodiment is cylindrical, is accommodated in the housing shell 28. On this housing shell 28 there is provided a support 38 constituting a recess, in which the motor 36 is placed with its end which is remote from the shaft 37. In order to secure the motor to the housing shell 28 there are provided three hooks 19, which are spaced from each other in the circumferential direction of the motor. Said hooks 19 project from the housing shell 28 and are resilient, so that their hook portions 20 each engage with an edge portion of the motor and thereby urge the motor against the support 38, thus securing the motor to the housing shell 28. On their free ends constituting the hook portions 20 the hooks have ramp surfaces 27, so that the motor can simply be snapped behind the hooks during assembly.

On the housing shell 29 there is provided a projection 21 corresponding to each of the hooks 19, which projection when the housing shells 28 and 29 are assembled engages with the relevant hook and thus constitutes a stop for said hook, so that the position of the hooks relative to the motor is defined, because the hooks then can no longer deflect.

Thus, the motor is reliably secured to the housing shell, whilst at the same time simple mounting without separate components is possible.

What is claimed is:

1. An apparatus such as a dry shaver, which comprises a housing assembly forced by two opposing housing shells; an electric motor within the housing assembly; at least one support member formed integrally with and extending inwardly from only one housing shell; an elastic pad associated with the inwardly projecting end of said support member; a resilient hook member adjacent said one support member, said resilient hook member being formed integrally with said one housing shell and projecting inwardly from only said one housing shell; a hook portion at the free end of said resilient hook member, said hook portion engaging an edge portion of the motor and urging said motor against the elastic pad and its associated support member to hold the motor only against said one housing shell; and a projection extending inwardly from only the other housing shell, said projection engaging the free end of the resilient hook member and constituting a stop for the same to thereby position the resilient hook member relative to the motor.

2. An apparatus according to claim 1, in which the free end of the resilient hook member is formed with a sloping surface to enable displacement of the resilient hook member by the motor as the motor is intially inserted into position.

* * * * *